(12) United States Patent
Feng et al.

(10) Patent No.: US 12,269,777 B2
(45) Date of Patent: Apr. 8, 2025

(54) HIGH-ENTROPY RARE EARTH-TOUGHENED TANTALATE CERAMIC AND PREPARATION METHOD THEREFOR

(71) Applicant: KUNMING UNIVERSITY OF SCIENCE AND TECHNOLOGY, Yunnan (CN)

(72) Inventors: Jing Feng, Yunnan (CN); Yunxuan Zhou, Yunnan (CN); Xiaoyu Chong, Yunnan (CN); Peng Wu, Yunnan (CN); Lin Chen, Yunnan (CN); Jun Wang, Yunnan (CN)

(73) Assignee: Kunming University of Science and Technology, Kunming (CN)

( * ) Notice: Subject to any disclaimer, the term of this patent is extended or adjusted under 35 U.S.C. 154(b) by 601 days.

(21) Appl. No.: 17/429,529

(22) PCT Filed: Nov. 12, 2019

(86) PCT No.: PCT/CN2019/117281
§ 371 (c)(1),
(2) Date: Aug. 9, 2021

(87) PCT Pub. No.: WO2020/253040
PCT Pub. Date: Dec. 24, 2020

(65) Prior Publication Data
US 2022/0106234 A1 Apr. 7, 2022

(30) Foreign Application Priority Data
Jun. 18, 2019 (CN) .......................... 201910526981.6

(51) Int. Cl.
*C04B 35/495* (2006.01)
*C04B 35/626* (2006.01)
*C04B 35/64* (2006.01)

(52) U.S. Cl.
CPC ........ *C04B 35/495* (2013.01); *C04B 35/6261* (2013.01); *C04B 35/6264* (2013.01);
(Continued)

(58) Field of Classification Search
CPC .................... C04B 35/495; C09K 11/77–7798
See application file for complete search history.

(56) References Cited

U.S. PATENT DOCUMENTS 4,225,653 A * 9/1980 Brixner .............. C09K 11/7769
250/483.1

FOREIGN PATENT DOCUMENTS

CN 105777118 A 7/2016
CN 106278260 * 1/2017
(Continued)

Primary Examiner — Matthew E. Hoban
(74) Attorney, Agent, or Firm — IPRTOP LLC

(57) ABSTRACT

The present disclosure provides a high-entropy rare earth-toughened tantalate ceramic. The ceramic is prepared by sintering $Ta_2O_5$ powder and x types of different $RE_2O_3$ powder, $4 \leq x \leq 9$, and the molar ratio of the $RE_2O_3$ powders is 1. $RE_2O_3$ powder and $Ta_2O_5$ powder having the molar ratio of RE to Ta being 1:1 are weighed, a solvent is added for mixing, and ball milling is performed by a ball mill to obtain mixed powder M; the powder M is dried at a temperature of 650-850° C. for 1.5-2 h to obtain dried powder; the powder is sieved to obtain powder N, the powder N is placed in a mold for first pressing to obtain a rough blank, and the rough blank is then pressed for the second time to obtain a compact blank; the compact blank is sintered to obtain the high-entropy rare earth-toughened tantalate ceramic.

14 Claims, 1 Drawing Sheet

(52) U.S. Cl.
CPC ........ *C04B 35/62655* (2013.01); *C04B 35/64* (2013.01); *C04B 2235/3225* (2013.01); *C04B 2235/3251* (2013.01); *C04B 2235/606* (2013.01); *C04B 2235/6567* (2013.01)

(56) References Cited

FOREIGN PATENT DOCUMENTS

| | | | |
|---|---|---|---|
| CN | 107285768 | A | 10/2017 |
| CN | 107662947 | A | 2/2018 |
| CN | 109836155 | A | 6/2019 |
| CN | 110078507 | A | 8/2019 |
| EP | 0097295 | A | 1/1984 |

\* cited by examiner

HIGH-ENTROPY RARE EARTH-TOUGHENED TANTALATE CERAMIC AND PREPARATION METHOD THEREFOR

CROSS REFERENCE TO RELATED PATENT APPLICATION

The present application is the US national stage of PCT/CN2019/117281 filed on Nov. 12, 2019, which claims the priority of the Chinese patent applications No. 201910526981.6 filed on Jun. 18, 2019, which application is incorporated herein by reference.

FIELD OF TECHNOLOGY

The present disclosure relates to the technical field of high-entropy ceramics, in particular to a high-entropy rare earth-toughened tantalate ceramic and a preparation method therefor.

BACKGROUND

High-entropy ceramic is a newly emerging ceramic, which has enriched the ceramic system. In the late 1990s, Professor Ye Junwei from National Tsing Hua University in Taiwan, China, proposed the concept of high entropy and defined it as having element types greater than or equal to 5, no dominant element, with the content of each element ranging from 5-35%. High-entropy ceramic powder can be sintered to obtain a stable solid solution phase. So far, researches on high entropy have mainly focused on the field of alloys, while high-entropy ceramic got little attention. Having high thermal conductivity, high melting point, good corrosion resistance, satisfying biocompatibility and good electrochemical performance, high-entropy ceramics have great development potential in the fields of ultra-high temperature, biomedicine and energy.

As there are few studies on high-entropy ceramics, the preparation methods of high-entropy ceramics are still in the exploratory stage. Currently, methods for preparing high-entropy ceramics include: ball milling in combination with heat treatment; spray granulation method; high-energy ball milling in combination with discharge plasma; and magnetron sputtering methods. However, the ceramics prepared by the above-mentioned methods usually have no sufficient density, which makes the ceramic materials prone to cracking when subjected to force. In addition, hardness and toughness of materials are contradictory in performance, that is, materials with high hardness usually have low toughness, materials with high toughness have lower hardness. Therefore, regarding how to overcome such contradiction, the inventors of the present disclosure developed a high-entropy rare earth-toughened tantalate ceramic material.

SUMMARY

The present disclosure provides a high-entropy rare earth-toughened tantalate ceramic with hardness and toughness both improved and a preparation method therefor.

In order to achieve the above object, the present disclosure adopts the following basic scheme:

A high-entropy rare earth-toughened tantalate ceramic, which is prepared by sintering $Ta_2O_5$ powder and x types of different $RE_2O_3$ powder, $4 \leq x \leq 9$, with the molar ratio of the $RE_2O_3$ powders equal to 1.

The technical principles and effects of this basic scheme are:

1. Different types of rare earth oxide powders are used, and the molar ratio of the rare earth oxide powders is equal to 1. Rare earth oxides and tantalum oxide are sintered to obtain a high-entropy rare earth tantalate. The obtained high-entropy rare earth tantalate not only has high hardness, but also has greatly improved toughness compared with single rare earth tantalate, thereby overcoming the contradiction between high hardness and high toughness.

2. It is found through research that the high-entropy rare earth tantalate obtained by the present disclosure has a certain ferroelasticity, which improves the toughness of the high-entropy rare earth tantalate. Generally speaking, due to the existence of ferroelasticity, when the material is under the action of an external force, the domain wall (the transition layer between two adjacent ferroelastic domains) deflects and absorbs a certain amount of strain energy, thereby slowing down the growth of microcracks and enhancing the toughness of the material.

Further, $RE_2O_3$ is selected from $Y_2O_3$, $Pm_2O_3$, $Gd_2O_3$, $Tb_2O_3$, $Dy_2O_3$, $Ho_2O_3$, $Er_2O_3$, $Tm_2O_3$ and $Lu_2O_3$.

Beneficial effects: based on experiments, it is proved that the hardness and toughness of the high-entropy rare earth tantalate ceramics are greatly improved when the rare earth oxides are selected from the above types of rare earth oxides.

Further, the present disclosure provides a method for preparing a high-entropy rare earth-toughened tantalate ceramic, including the following operations:

operation (1): weighing $RE_2O_3$ powder and $Ta_2O_5$ powder according to the molar ratio of RE to Ta being 1:1, adding solvent for mixing, and performing ball milling to obtain mixed powder M;

operation (2): drying the powder M obtained in operation (1) at a temperature of 650-850° C. for 1.5-2 h to obtain dried powder;

operation (3): sieving the powder obtained in operation (2) to obtain powder N, pressing the powder N to obtain a compact blank;

operation (4): sintering the compact blank obtained in operation (3) to obtain a high-entropy rare earth-toughened tantalate ceramic, the sintering temperature being 1600-1750° C., and the sintering time being 10-15 h;

Beneficial effects: the high-entropy rare earth-toughened tantalate ceramic prepared by operations (1)-(4) has low internal porosity; the hardness of the ceramic is 5.61-6.56 GPa and the toughness is 2.73-3.54 Mpa·m$^{1/2}$. Compared with single rare earth tantalate ceramics (such as rare earth yttrium tantalate, which has a hardness of 5.15 GPa and a toughness of 2.37 MPa·m$^{1/2}$), the hardness and toughness of the high-entropy rare earth tantalate ceramics prepared by the present disclosure are greatly improved.

Operation (1) aims to mechanically mix $RE_2O_3$ powder and $Ta_2O_5$ powder uniformly, and the addition of solvent is to reduce the surface activity of $RE_2O_3$ powder and $Ta_2O_5$ powder and reduce the adhesion between the powders.

Operation (2) aims to, on the one hand, remove the solvent in powder M, and on the other hand, absorb a part of the internal energy in the powder to reduce the sintering activity of the powder M, thereby increasing the reaction temperature of the powder M, so as to prevent the powder M from reacting at a lower temperature and forming a second phase. At the same time, the formation of impurities during the final high-temperature sintering is prevented. Further, since the temperature during the drying did not reach the reaction temperature, no chemical reaction occurred at this time.

In operation (3), the powder is pressed to fully discharge the gas inside the powder, thereby reducing the gas inside the powder during sintering, decreasing the number of pore defects, and improving the compactness of the final sintered ceramic.

For the high-entropy rare earth tantalate ceramic material obtained in operation (4), since the drying deactivation performed in operation (2) at 650-850° C. for 1.5-2 h has increased the sintering temperature, the tantalum oxide and multiple rare earth oxides can form a relatively pure single phase at such a high temperature. It should be noted that during the heating process of high-temperature sintering, a single rare earth tantalate phase may appear, but the rare earth atoms in this single phase would be re-dissolved in the subsequent high-temperature sintering process, thus forming single-phase high-entropy rare earth tantalate ceramics.

Further, in operation (1), the speed of the ball mill is 400-500 r/min, and the ball milling time is 180-240 min.

Beneficial effects: the $RE_2O_3$ powder and $Ta_2O_5$ powder can be fully mixed evenly by using the ball milling speed and ball milling time in this technical scheme.

Further, in operation (3), the sieving mesh is 400-500 mesh.

Beneficial effects: by adopting the sieving mesh in this technical scheme for sieving, the finally obtained powder N has a moderate particle size and a relatively uniform particle size distribution, so that the compactness of the sintered powder is improved.

Further, in operation (3), the pressure of the first pressing is 6-10 MPa, and the pressing time is 6-10 min.

Beneficial effects: in this way, the powder N is initially formed into a block, which is convenient for subsequent pressing with increased pressure.

Further, in operation (3), the pressure of the second pressing is 350-450 MPa, and the pressing time is 10-30 min.

Beneficial effects: a compact blank can be obtained using the above-mentioned pressing pressure and pressing time so that during sintering, there is less gas inside the powder.

Further, in operation (1), the purity of $RE_2O_3$ powder and $Ta_2O_5$ powder is not less than 99.99%.

Beneficial effects: the use of high-purity powder raw materials can reduce the content of introduced impurity elements, which prevents the formation of microcracks and reduction of the compactness of the final sintered block due to the introduction of impurity elements into the crystals. Further, the solvent in operation (1) is ethanol or distilled water.

Beneficial effects: ethanol and distilled water have good dispersibility for $RE_2O_3$ powder and $Ta_2O_5$ powder, so that $RE_2O_3$ powder and $Ta_2O_5$ powder can be fully mixed.

Further, in operation (1), the molar ratio of the sum of $RE_2O_3$ powder and $Ta_2O_5$ powder to the solvent is (3:1)-(5:1).

Beneficial effects: it is verified by the present disclosure through experiments that when the ratio of the sum of $RE_2O_3$ powder and $Ta_2O_5$ powder to the solvent is within the above range, the obtained powder A is most fully mixed.

DETAILED DESCRIPTION OF THE EMBODIMENTS

Figure 1:
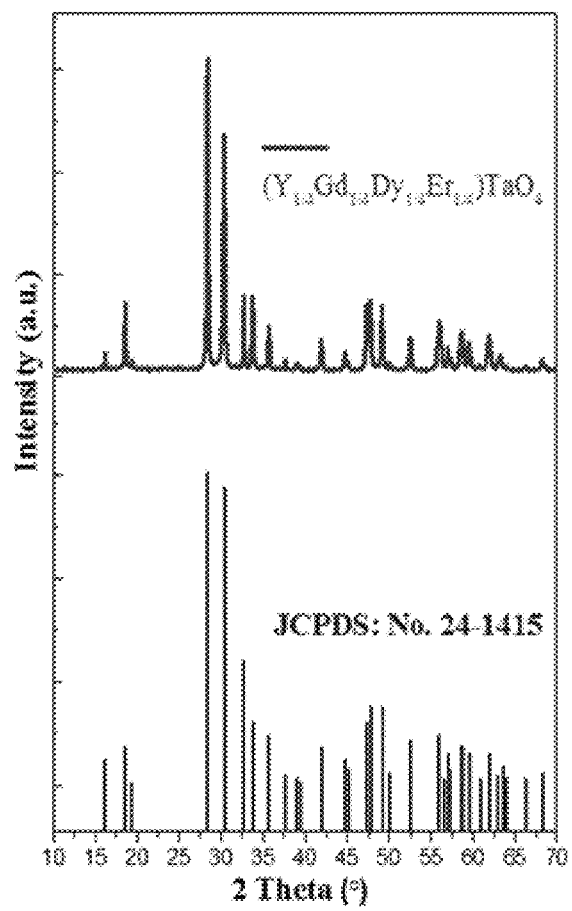
FIG. 1 shows the X-ray diffraction pattern (XRD pattern) of the $(Y_{1/4}Gd_{1/4}Dy_{1/4}Er_{1/4})TaO_4$ high-entropy rare earth-toughened tantalate ceramic prepared in Embodiment 1.

The present disclosure will be described in more detail by using the embodiments below:

A high-entropy rare earth-toughened tantalate ceramic, which is prepared by sintering $Ta_2O_5$ powder and x types of different $RE_2O_3$ powder, $4 \leq x \leq 9$, and the molar ratio of the $RE_2O_3$ powders is 1; the $RE_2O_3$ powders are selected from $Y_2O_3$, $Pm_2O_3$, $Gd_2O_3$, $Tb_2O_3$, $Dy_2O_3$, $Ho_2O_3$, $Er_2O_3$, $Tm_2O_3$ or $Lu_2O_3$.

A method for preparing the high-entropy rare earth-toughened tantalate ceramic, including the following operations:

Operation (1): weighing $RE_2O_3$ powder and $Ta_2O_5$ powder according to the molar ratio of RE to Ta being 1:1, adding distilled water or ethanol solvent for mixing, the molar ratio of the sum of $RE_2O_3$ powder and $Ta_2O_5$ powder to the solvent being (3:1)-(5:1), and performing ball milling by a ball mill to obtain mixed powder M. The ball mill is a variable frequency planetary ball mill (model: XQM), the speed of the ball mill is 400-500 r/min, the milling time is 180-240 min, and the purity of the raw materials $RE_2O_3$ powder and $Ta_2O_5$ powder is not less than 99.9%.

Operation (2): drying the powder M obtained in operation (1) at a temperature of 650-850° C. for 1.5-2 h to obtain dried powder.

Operation (3): sieving the powder obtained in operation (2) to obtain powder N, the sieving mesh being 300-400 mesh; placing the powder N in a mold for the first pressing to obtain a rough blank; pressing the rough blank for the second time with a cold isostatic press (model: 21955-2) to obtain a compact blank; the pressure of the first pressing is 6-10 MPa, and the pressing time is 6-10 min; the pressure of the second pressing is 350-450 MPa, and the pressing time is 10-30 min.

Operation (4): sintering the compact blank in operation (3) to obtain a high-entropy rare earth-toughened tantalate ceramic, the sintering temperature being 1600-1750° C., and the sintering time being 10-15 h; during high temperature sintering, the heating rates are as follows: heating at 5° C./min to 700° C., holding for 30 min; heating at 4° C./min to 1200° C., holding for 30 min; and heating at 1-3° C./min to 1600-1750° C.

The high-entropy rare earth-toughened tantalate ceramic with hardness of 5.61-6.56 GPa and toughness of 2.73-3.54 MPa·m$^{12}$ is obtained by the above method. To fully illustrate the high hardness and high toughness of the high-entropy rare earth tantalate ceramic prepared by the above method, six groups of Embodiments are selected for illustration.

Table 1 shows the specific parameters of Embodiments 1-6 of the present disclosure (a slash in the table indicates the absence of a corresponding ingredient):

| | Embodiment | 1 | 2 | 3 | 4 | 5 | 6 |
|---|---|---|---|---|---|---|---|
| $RE_2O_3$ (g) | $Y_2O_3$ | 0.475 | 0.367 | 0.300 | 0.254 | 0.222 | 0.199 |
| | $Pm_2O_3$ | — | — | — | — | — | 0.298 |
| | $Gd_2O_3$ | 0.761 | 0.587 | 0.481 | 0.408 | 0.356 | 0.319 |
| | $Tb_2O_3$ | — | — | — | — | 0.360 | 0.322 |
| | $Dy_2O_3$ | 0.785 | 0.605 | 0.495 | 0.421 | 0.367 | 0.328 |
| | $Ho_2O_3$ | — | — | — | 0.426 | 0.372 | 0.333 |
| | $Er_2O_3$ | 0.804 | 0.619 | 0.508 | 0.431 | 0.376 | 0.336 |
| | $Tm_2O_3$ | — | — | 0.512 | 0.435 | 0.380 | 0.339 |
| | $Lu_2O_3$ | — | 0.646 | 0.528 | 0.448 | 0.392 | 0.350 |
| $Ta_2O_5$ (g) | | 5.525 | 5.525 | 5.525 | 5.525 | 5.525 | 5.525 |
| Ball milling | Speed (r/min) | 450 | 450 | 450 | 400 | 450 | 500 |
| | Time (min) | 200 | 200 | 180 | 200 | 200 | 240 |
| Drying | Temperature (° C.) | 650 | 650 | 650 | 750 | 650 | 850 |
| | Time (h) | 1.5 | 1.5 | 1.5 | 1.5 | 2 | 2 |
| Sieving | Sieving mesh | 300 | 300 | 300 | 400 | 400 | 300 |
| First pressing | Pressure of the pressing (MPa) | 8 | 8 | 6 | 8 | 10 | 8 |
| | Pressing time (min) | 8 | 8 | 10 | 8 | 6 | 8 |
| Second pressing | Pressure of the pressing (MPa) | 400 | 400 | 350 | 400 | 450 | 400 |
| | Pressing time (min) | 15 | 15 | 30 | 15 | 10 | 15 |
| Sintering | Sintering temperature (° C.) | 1700 | 1700 | 1700 | 1600 | 1700 | 1750 |
| | Sintering time (h) | 10 | 10 | 10 | 15 | 10 | 10 |

Three groups of Comparative Examples and the high-entropy rare earth-toughened tantalate ceramics obtained in Embodiments 1-6 are listed for comparative experiments:

Comparative Example 1: Comparative Example 1 differs from Embodiment 1 in that the operation (2) is not performed in Comparative Example 1.

Comparative Example 2: Comparative Example 2 differs from Embodiment 1 in that in operation (4) of Comparative Example 2, the sintering temperature is 1100-1300° C., and the sintering time is 3-5 h.

Comparative Example 3: Comparative Example 3 differs from Embodiment 1 in that only the rare earth oxide $Y_2O_3$ is added to obtain the $YTaO_4$ ceramic in Comparative Example 3.

The ceramics of Embodiments 1-6 and Comparative Examples 1-3 are tested:

1. Xrd Characterization:

The ceramic materials obtained in Embodiments 1-6 and Comparative Examples 1-3 are examined by X-ray diffractometer. Taking the $(Y_{1/4}Gd_{1/4}Dy_{1/4}Er_{1/4})TaO_4$ high-entropy ceramic obtained in Embodiment 1 as an example, the XRD pattern is shown in FIG. 1. As can be seen from the XRD test result in FIG. 1, the diffraction peaks of the $(Y_{1/4}Gd_{1/4}Dy_{1/4}Er_{1/4})TaO_4$ ceramic sample correspond to the standard peaks of the standard PDF card JCPDS: No. 24-1415, and there isn't any second-phase diffraction peak, indicating that the crystal structure of the prepared ceramic material is single phase and no impurity phase is produced.

Regarding Comparative Examples 1-2, some impurity phases are found by the XRD diffraction experiments. Comparative Example 1 does not have the pre-drying operation, therefore, on the one hand, there is still a certain amount of solvent or moisture in the powder M, and on the other hand, the absence of pre-deactivation treatment on the powder results in high surface activation energy of the powder M and lowered its reaction temperature, which means that tantalum oxide would react with a single species of rare earth oxide at low temperature to form a large number of second phases. Regarding Comparative Example 2, since both the sintering temperature and the sintering time have been reduced, the reaction temperature for producing a single-phase high-entropy ceramic has not been reached, thus forming impurity phases dominated by the second phase.

2. Hardness and Toughness Testing

Figure 2:
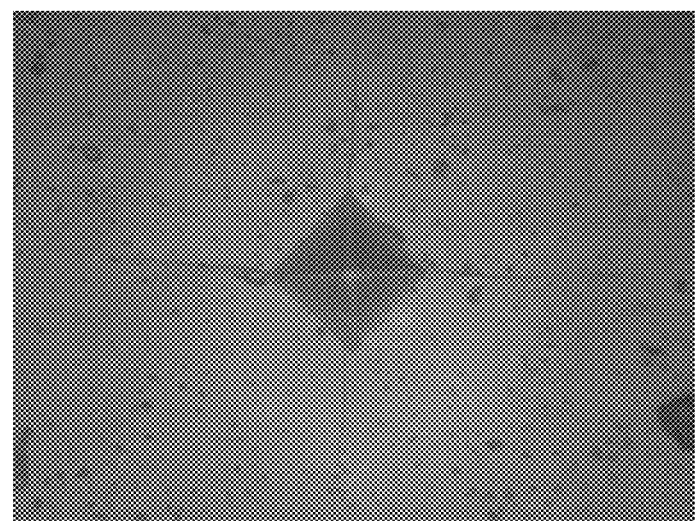
FIG. 2 is a diagram showing the toughness test of $(Y_{1/9}Gd_{1/9}Dy_{1/9}Er_{1/9}Lu_{1/9}Tm_{1/9}Ho_{1/9}Tb_{1/9}Pm_{1/9})TaO_4$ high-entropy rare earth-toughened tantalate ceramic prepared in Embodiment 6.

The hardness of the ceramics obtained in Embodiments 1-6 and Comparative Examples 1-3 is measured with a Vickers hardness tester. The fracture toughness of the material is calculated based on the diagonal length of the indentation and the crack length of the four corners. The test results are shown in Table 2 below. Taking the $(Y_{1/9}Gd_{1/9}Dy_{1/9}Er_{1/9}Lu_{1/9}Tm_{1/9}Ho_{1/9}Tb_{1/9}Pm_{1/9})TaO_4$ high-entropy ceramic obtained in Embodiment 6 as an example, the toughness diagram is shown in FIG. 2.

The formula related is Vickers hardness:

$$HV = \frac{F}{S} = \frac{2F\sin(\theta/2)}{d^2} = 1.854\frac{F}{d^2}$$

(Unit: GPa), where HV represents the Vickers hardness of high-entropy ceramics, and F and d represent the test load and the diagonal length of the indentation, respectively. Fracture toughness: $K_{IC} = 0.0725*(P/a^{3/2})$ (unit: Mpa·m$^{1/2}$), where P represents the test load, and a represents the average crack length.

Table 2 shows the results of hardness and toughness tests of Embodiments 1-6 and Comparative Examples 1-3.

|  | Vickers hardness (GPa) | Fracture toughness (MPa·m$^{1/2}$) |
|---|---|---|
| Embodiment 1 | 5.61 | 2.73 |
| Embodiment 2 | 5.83 | 2.76 |
| Embodiment 3 | 6.07 | 3.01 |
| Embodiment 4 | 6.29 | 3.22 |
| Embodiment 5 | 6.42 | 3.45 |
| Embodiment 6 | 6.56 | 3.54 |
| Embodiment 1 | 5.57 | 2.54 |
| Embodiment 2 | 5.3 | 2.34 |
| Embodiment 3 | 5.15 | 2.37 |

As can be seen from the experimental results in Table 2:

(1) The more types of rare earth oxides added, the higher the hardness and toughness of the obtained rare earth-toughened ceramic materials; in this embodiment, when there are 9 types of rare earth oxides added (x=9), the hardness of the ceramic materials reaches 6.56 GPa, and the toughness of the ceramic materials reaches 3.54 Mpa·m$^{1/2}$.

(2) Compared with traditional rare earth tantalates, the high-entropy rare earth tantalate prepared by the present disclosure has higher hardness and toughness. Taking the $(Y_{1/9}Gd_{1/9}Dy_{1/9}Er_{1/9}Lu_{1/9}Tm_{1/9}Ho_{1/9}Tb_{1/9}Pm_{1/9})TaO_4$ ceramic obtained in Embodiment 6 as an example, the hardness is 6.56 GPa and the toughness is 3.54 Mpa·m$^{1/2}$. As for Comparative Example 3, the hardness of YTaO$_4$ ceramics is 5.15 GPa, and the toughness is 2.37 MPa·m$^{1/2}$. The results indicate that compared with the single rare earth tantalate ceramic (YTaO$_4$ ceramic in Comparative Example 3), the hardness of the high-entropy ceramic obtained in Embodiment 6 is improved by 27.4%, and the toughness is improved by 49%.

The descriptions above are merely embodiments of the present disclosure, and common knowledge such as specific structures and features that are well-known in the schemes will not be described in detail herein. It should be noted that for those skilled in the art, variations and improvements may be made without departing from the structure of the present disclosure, these variations and improvements are within the scope of the present disclosure, and will not affect the implementation effect or practicality of the present disclosure. The protection scope of the present disclosure is subject to the protection scope defined in claims. The specific embodiments of the present disclosure may be used to interpret the content of the claims.

The invention claimed is:

1. A high-entropy rare earth-toughened tantalate ceramic, which is prepared by sintering Ta$_2$O$_5$ powder and x types of different RE$_2$O$_3$ powders, wherein 4≤x≤9, the RE$_2$O$_3$ is selected from Y$_2$O$_3$, Pm$_2$O$_3$, Gd$_2$O$_3$, Tb$_2$O$_3$, Dy$_2$O$_3$, Ho$_2$O$_3$, Er$_2$O$_3$, Tm$_2$O$_3$, and Lu$_2$O$_3$, and the molar ratio between x types of different RE$_2$O$_3$ powders is 1:1;

and wherein a hardness of the high-entropy rare earth-toughened tantalate ceramic is in a range of 5.61-6.56 GPa and a toughness of the high-entropy rare earth-toughened tantalate ceramic is in a range of 2.73-3.54 MPa·m$^{1/2}$.

2. The high-entropy rare earth-toughened tantalate ceramic according to claim 1, wherein in the high-entropy rare earth-toughened tantalate ceramic, the molar ratio of total RE to Ta is 1:1.

3. A method for preparing the high-entropy rare earth-toughened tantalate ceramic of claim 2, comprising the following operations:

operation (1): weighing the RE$_2$O$_3$ powder and the Ta$_2$O$_5$ powder according to a molar ratio of RE to Ta being 1:1, adding solvent for mixing, and performing ball milling to obtain mixed powder M;

operation (2): drying the powder M obtained in operation (1) at a temperature of 650-850° C. for 1.5-2 h to obtain dried powder;

operation (3): sieving the powder obtained in operation (2) to obtain powder N, pressing the powder N to obtain a compact blank;

operation (4): sintering the compact blank obtained in operation (3) to obtain a high-entropy rare earth-toughened tantalate ceramic, the sintering temperature being 1600-1750° C., and the sintering time being 10-15 h.

4. The method for preparing the high-entropy rare earth-toughened tantalate ceramic according to claim 3, wherein in operation (1), the ball milling speed is 400-500r/min, and the ball milling time is 180-240 min.

5. The method for preparing the high-entropy rare earth-toughened tantalate ceramic according to claim 3, wherein a mesh of 300-400 mesh is utilized for sieving in operation (3).

6. The method for preparing the high-entropy rare earth-toughened tantalate ceramic according to claim 3, wherein in operation (3), the pressure of a first pressing is 6-10 MPa, and the pressing time of the first pressing is 6-10 min.

7. The method for preparing the high-entropy rare earth-toughened tantalate ceramic according to claim 3, wherein in operation (3), the pressure of a second pressing is 350-450 MPa, and the pressing time of the second pressing is 10-30 min.

8. The method for preparing the high-entropy rare earth-toughened tantalate ceramic according to claim 3, wherein in operation (1), the purity of the RE$_2$O$_3$ powder and the Ta$_2$O$_5$ powder is not less than 99.99%.

9. The method for preparing the high-entropy rare earth-toughened tantalate ceramic according to claim 8, wherein the solvent in operation (1) is ethanol or distilled water.

10. The method for preparing the high-entropy rare earth-toughened tantalate ceramic according to claim 9, wherein in operation (1), the molar ratio of the sum of the RE$_2$O$_3$ powder and the Ta$_2$O$_5$ powder to the solvent is (3:1)-(5:1).

11. The method for preparing the high-entropy rare earth-toughened tantalate ceramic according to claim 4, wherein in operation (1), the purity of the RE$_2$O$_3$ powder and the Ta$_2$O$_5$ powder is not less than 99.99%.

12. The method for preparing the high-entropy rare earth-toughened tantalate ceramic according to claim 5, wherein in operation (1), the purity of the RE$_2$O$_3$ powder and the Ta$_2$O$_5$ powder is not less than 99.99%.

13. The method for preparing the high-entropy rare earth-toughened tantalate ceramic according to claim 6, wherein in operation (1), the purity of the RE$_2$O$_3$ powder and the Ta$_2$O$_5$ powder is not less than 99.99%.

14. The method for preparing the high-entropy rare earth-toughened tantalate ceramic according to claim 7, wherein in operation (1), the purity of the RE$_2$O$_3$ powder and the Ta$_2$O$_5$ powder is not less than 99.99%.

* * * * *